INVENTOR
GORDON A. CARLSON

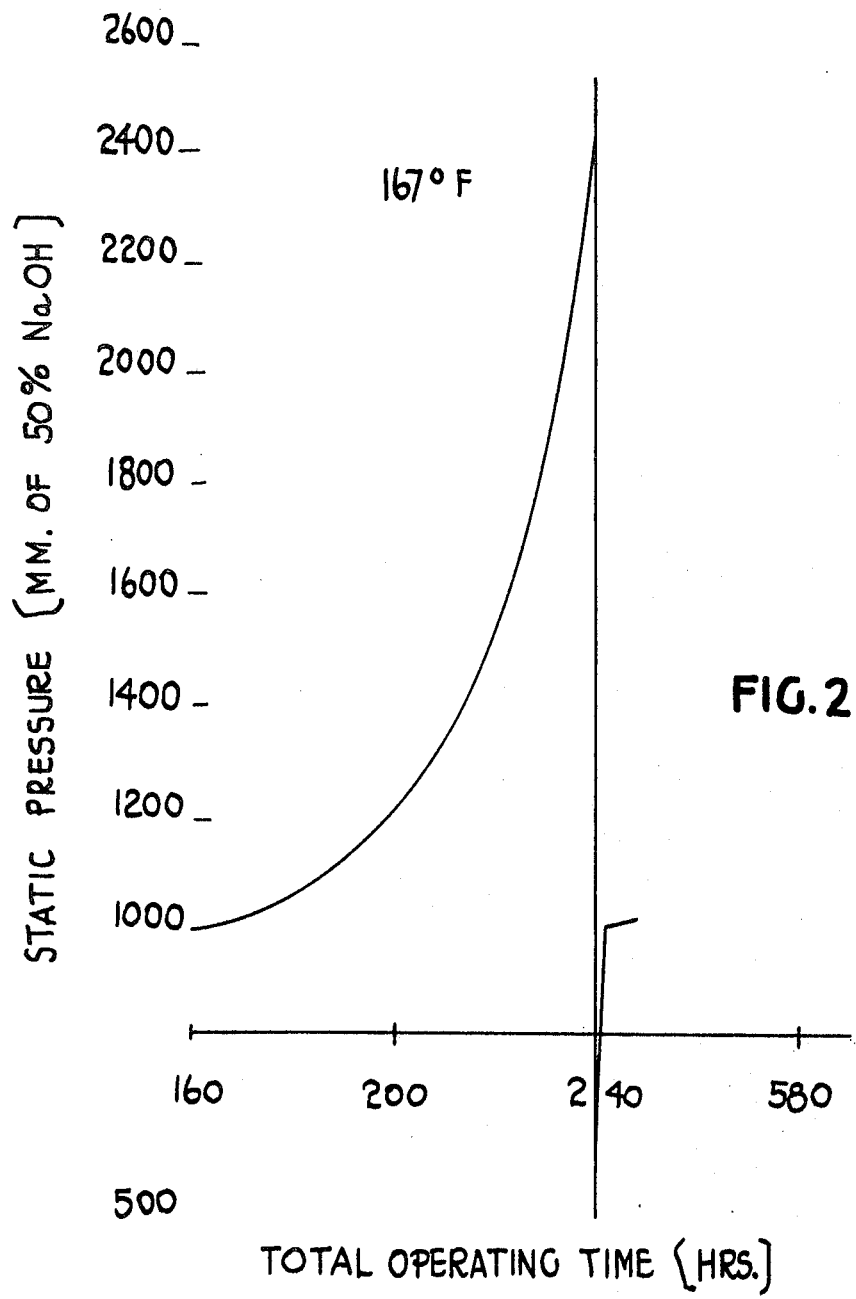

United States Patent Office 3,459,646
Patented Aug. 5, 1969

3,459,646
ALKALI METAL HYDROXIDE PURIFICATION
Gordon A. Carlson, New Martinsville, W. Va., assignor to PPG Industries, Inc., Pittsburgh, Pa., a corporation of Pennsylvania
Continuation-in-part of applications Ser. No. 506,101, Nov. 2, 1965, and Ser. No. 561,999, June 30, 1966. This application June 25, 1968, Ser. No. 739,741
Int. Cl. C01d 1/40, 1/04; B01k 3/04
U.S. Cl. 204—153
17 Claims

ABSTRACT OF THE DISCLOSURE

Aqueous alkali metal hydroxide solution is treated to remove metal ion impurity by passing the solution through a porous cathode, preferably a porous graphite carbon cathode, of an electrolytic cell while electrolyzing the solution.

---

Figure 1:
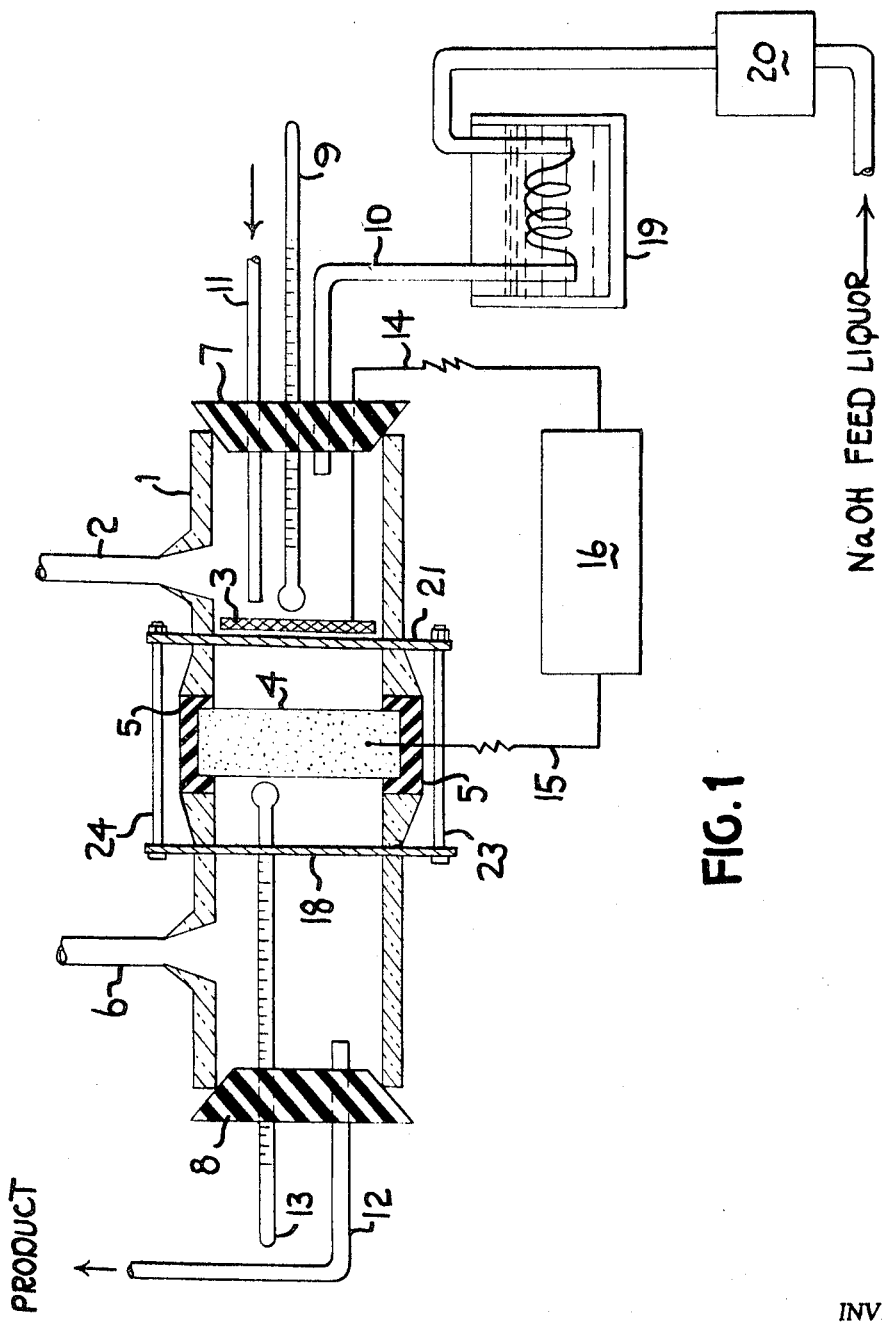

This application is a continuation-in-part of our copending applications U.S. Ser. No. 506,101, filed Nov. 2, 1965, and now abandoned, and Ser. No. 561,999, filed June 30, 1966, and now abandoned.

The present invention relates to the production of alkali metal hydroxide. More particularly the present invention relates to methods for improving the purity of alkali metal hydroxide solutions. Still more particularly, the present invention relates to methods for removing metal ion contamination from aqueous alkali metal hydroxide, sodium hydroxide in particular and particularly those solutions prepared by electrolytic decomposition of alkali metal chloride solutions.

With the advent in the art of the mercury cell and its increasing popularity among caustic-alkali producers the demand for alkali metal hydroxide solutions containing low metal ion contamination has increased sharply. While generally alkali metal hydroxide solutions, sodium hydroxide in particular, prepared by electrolysis of alkali metal chloride solution in mercury cells contain little or no iron or other metal ion contamination, frequently metal ion contamination occurs during storage and processing at the customer's plant. In addition, alkali metal hydroxide solutions prepared by electrolytic methods utilizing diaphragm cells contain varying concentrations of iron and other metal ion impurities which are sometimes undesirable in aqueous alkali metal hydroxide solutions.

Thus, the production of aqueous alkali metal hydroxide solutions containing little or no metal ion contamination is a desirable goal for the alkali producer. Further, the processing of aqueous alkali metal hydroxide solutions which contain metal ion impurities for the removal of these impurities is desirable provided that ions contaminating such solutions can be removed with little or no difficulty and at a relatively low cost.

In accordance with the instant invention, it has now been discovered that aqueous alkali metal hydroxide solutions containing metal ion impurities can be treated in a relatively safe, efficient and economical manner for the substantially complete removal of these impurities or a reduction to such a low level that their presence is no longer bothersome. Unlike those expedients which rely upon absorption for removing metal ion impurities such as treatment with limestone, dolomite or magnesium salts, the present invention avoids the addition of alkaline earth metal ions, and thus circumvents the disadvantage of haze promotion attributed to these ions.

Pursuant to the teachings of this invention aqueous solutions of alkali metal hydroxide containing varying concentrations of metal ion impurities are passed through an electrolytic cell having a porous cathode. It has been theorized that metal ion impurities, for example iron, present in alkali metal hydroxide solutions are contained in these solutions as complex anions. Thus, by passing the solution containing these complex anions in close proximity to the cathode of an electrolytic cell to wit, in actual physical contact with the cathode by passage through the pores of the cathode, an electrolytic reduction of the metal ions contained in the complex anions takes place and the metal ion once reduced plates out at the cathode surface. Thus, iron may be present as a ferrate in such solutions. As this ion passes through the pores of the cathode, it undergoes reduction until iron is plated out in the cathode. Thus, reduction of metal ions probably present as complex anions in such solutions at the cathode of the cell results in the discharge of the metal ion at the cathode surface and a subsequent plating out of this ion as a metal from the alkali metal hydroxide solutions flowing through the cathode. This theory is postulated on the fact that electrolysis of alkali metal hydroxides contaminated with, for example, iron ordinarily results in little if any metal plating out on the cathode of a cell where metal ion concentrations are low and the hydroxide is flowing through a cell.

For a more complete understanding of the instant invention reference is made to the accompanying drawings and the ensuing description which illustrate the instant invention and describe the various conditions which may be utilized to successfully conduct the process of the instant invention.

Turning to the drawing in FIGURE 1, there is shown a cell housing generally indicated at 1 containing an anode 3 and a cathode 4. Cathode 4 is provided with corrosion resistant gasket 5 to seal it to the cell housing 1. Located in the cell housing are standpipes 2 and 6, on the anode side of the cell and cathode side of the cell, respectively. The cell is closed at its ends by plugs or stoppers 7 and 8. On the anode side of the cell a thermometer 9 is provided as well as a feed liquor inlet 10. In the upper portion of the anode side of the cell housing 1 is a thermo-regulator 11 for a heater (not shown). On the cathode side of the cell a discharge line 12 is provided and a thermometer element 13 is also positioned therein. The electrical connection to the DC power source is made via line 14 to anode member 3 and via line 15 to the cathode member 4. The power source and meters are shown diagrammatically at 16. The feed entering the cell through line 10 is passed through an oil bath 19 prior to its entry into the cell. The feed liquor is pumped to the cell by means of a positive displacement pump indicated generally by the block 20. The cell housing 1 is held rigidly up against the gasket 5 by means of rings 18 and 21 which are clamped with bolt elements 23 and 24.

In a typical operation of the cell of FIGURE 1 sodium hydroxide liquid feed is pumped via positive displacement pump 20 through the oil bath 19 where it is heated (primarily to facilitate ease of flow through the cell) to a temperature of approximately 140 to 180° F. Higher temperatures can also be used. Lower temperatures also work, especially with other alkali metal hydroxides whose 50 percent solutions have lower viscosities. For example, 70° F. is perfectly suitable with 50 percent potassium hydroxide. The anode 3 and cathode 4 of the cell are activated by connecting them to the power source. Cathode 4 of the cell is constructed of porous graphite which has a density of approximately 66 pounds per cubic foot, a tensile strength of about 110 pounds per square inch, a compressive strength of approximately 500 pounds per square inch, and a flexure strength of about 250 pounds per square inch. The percent porosity of the graphite is about 48 percent with an average pore diameter in the cathode of .0019 inch. Graphite of this character has a permeability of approximately 30 gallons of water at 70° F. through a one inch thick plate under 5 pounds per square inch gauge per square foot per minute.

The caustic soda feed pumped via line 10 into the cell is pumped by pump 20 at a rate such that a back pressure on the anode side of the cell is reflected in a column of caustic soda forming in standpipe 2 is approximately 1,000 millimeters in height. The head on this standpipe varies during the operation depending upon the back pressure on the cathode, the flow rate of feed being maintained constant at the pump 20. During its passage through the cell 1 the caustic soda feed liquor passes through the pores of the graphite cathode 4 shown in FIGURE 1 and metal ion contamination contained in the caustic soda feed is removed by the discharge of electrons at cathode 4 and the plating out of the metal in the pores of and on the surface of the graphite cathode 4. The purified caustic soda is removed from the cell 1 through outlet 12. Oxygen liberated during the electrolysis is removed through standpipe 2 and hydrogen which is formed during the electrolysis is removed through standpipe 6. Operating in this manner metal ion contaminated caustic feed liquor can be swiftly and efficiently purified of metal ion contamination by the plating out of the metal ions on and in the pores of the porous cathode located in the center of the cell.

Many modifications may be made of the diagrammatic illustration shown in FIGURE 1 of the drawing without departing from the scope of the invention.

While the cell shown in the drawing contains no diaphragm, as a conventional alkali-chlorine diaphragm cell possesses one, a diaphragm may be employed if desired. If a diaphragm is utilized it is placed between the anode and the cathode of the cell or it may be affixed to the surface of the cathode. The important consideration in the utilization of any diaphragm in conjunction with a cell of the character shown in the drawing is that the diaphragm be porous to liquor flow so that liquor can be passed through the cathode at rates that conform to or closely approach the permeability characteristics of the particular cathode materials employed. A diaphragm is useful in the operation of a cell of this character to prevent any oxygen and hydrogen mixing on either the anode or cathode side of the cell. Oviously a mixture of these two gases within explosive ranges in either of the standpipes 2 or 6 in a conditiion which it is desirable to avoid.

Suitable anode materials for utilization in a cell of this character woud be any metallic, graphite or carbon anode material which is substantially inert to the alkali metal hydroxide liquors being fed to the inlet side of the cell. Thus, materials such as metals, for example, nickel, graphite, carbon and the like may be employed. Nickel forms a preferred anode material with respect to this cell though obviously as previously stated other electrically conductive materials inert to the alkali metal hydroxide solution treated may be employed.

Ideally, the cathode of the cell is constructed of any porous carbon such as porous graphite; other electrically conductive materials inert to the aqueous alkali metal hydroxides undergoing treatment with appropriate porosity however may be used. Nickel and nickel alloys (Inconel) are materials of construction for the porous cathodes which function, although carbon cathodes are superior. Other useful metals include zirconium, molybdenum, silver and Hastalloys. Less desirable, but operative metals include steel, cast iron, chrome plated steel and tungsten. Their use is primarily appropriate under only cathodic conditions and with alkali or non-acidic regenerations. The important consideration in selecting these materials for the cathode of a cell of this character is that the cathode possesses a certain and definite porosity. Preferably, the cathode is constructed so that it possesses a permeability to water at 70° F. of at least 14 gallons per square foot per minute with 5 pounds per square inch gauge pressure applied to a plate of the cathode material one inch thick, preferably a permeability considerably greater than this, for example, 30 to 150 gallons per square foot per minute. In the case of a slightly permeable cathode material, that is for example, one with permeability of 14 gallons per square foot per minute, the thickness of the graphite can be reduced somewhat provided adequate strength is present in the material to insure against fracturing. Porous electrode material which possesses a tensile strength of 60 pounds per square inch or greater is typical of materials which may be employed.

In addition to the permeability considerations with respect to the individual cathode employed in the cell it will also be obvious to the skilled are that where these cells are employed in series, suitable adjustments may be made to provide for several contacts with cathodic material. In this instance the permeability of the cathode material can be greatly increased since contacts will be made with several cathodes during the purification process. This will be more readily understood as described hereinafter.

Thus, in conducting the process of the instant invention the alkali metal hydroxide liquors to be treated and purified may be passed through a single individual cell and electrolysis conducted therein for the substantial removal of metal ion impurities contained therein. In the alternative the liquor to be treated can be passed through a plurality of cells in series. For example, where large quantities of sodium hydroxide liquors are to be treated, the entire production of a cell circuit can be passed through a single individual cell provided the cathode material is sized in such a way and possesses sufficient permeability so that adequate flow rates can be maintained through the individual cell and correlated to the flow rate of the caustic liquor production of that cell circuit while still permitting adequate ion removel on the cathode. If desired, of course, in a situation where the entire production of a given cell circuit or circuits is being purified in accordance with the teachings of this invention, a plurality of cells of the character shown diagrammatically in FIGURE 1 herein can be employed in series. In such an instance the cell liquor or aqueous caustic liquor contaminated with metal ion impurities is passed sequentially through a plurality of cells to insure adequate removal of the metal ion impurities from the liquor as it flows from cell to cell.

As will be understood, during the metal ion impurity removal accomplished in accordance with this invention a buildup of metal in the pores of the graphite results ultimately in a considerable reduction in the permeability of a given cathode. Thus, by operating a series of cells of this character when the first cell in the series begins to show signs of substantial reduction in the porosity of the graphite, this cell may be bypassed and the feed introduced to a second cell in the series so that the first cell can be shut down for replacement of the cathode or for treatment of the cathode for removal of the metal plated thereon. When the first cell has been regenerated by replacement or treatment of the cathode it may once again be placed in service in the series.

Still another method of operating in accordance with this invention involves the operating of a plurality of smaller cells designed to take the entire capacity of a cell circuit or cell circuits, the cells being operated in parallel. Thus, the production of a cell circuit can be split into several streams and these individual streams then passed through cells of smaller dimension for the removal of the metal ion impurities contained therein. This plurality of cells obviously can be considerably smaller than a single cell taking the same capacity of liquor. In addition in this type of embodiment if desired the parallel cells can even be made smaller with high permeability and a plurality of such cells operated in series in each paralleled circuit utilized so that the cell liquor feed from a given cell circuit is passed through a plurality of cells in parallel and these cells which are arranged in parallel are constructed on a small scale so that several of them can be used in series in each paralleled unit. In this operation the advantages of series operation hereinbefore mentioned and the advantages of a parallel operation, that is a substantial reduction in the size of the cell needed to accomplish a given quantity of purification are both realized.

In operating these cells, the cell voltage and amperes necessary to plate out the quantities of metal ion impurities contained in the caustic liquor being treated are employed. Generally speaking the cells will range in voltage from 1½ to 5 volts. The particular volts used will depend upon the electrode used and the electrode gap and other similar considerations. With the current density of a cell of this character as low as 10 amps per square foot of cathode frontal (face) area especially satisfactory deposition of the metal ion impurities contained in an alkali metal hydroxide solution will be obtained. Obviously, however, the current density value can be varied considerably and current densities upwardly from about 10 or 13 to 400 amps per square foot or more may be employed. At higher current densities gas binding may occur at the cathode surface and increased flow rates of the liquor being purified may be utilized when higher current densities are employed to help avoid the consequences of such gas binding. Current densities below 10 amps per square foot, e.g., in the range of 1 to 5 amps per square foot may be employed. Usually it is then advisable to provide a downward adjustment in liquid flow rate through the cell.

As previously stated, during the operating of a cell of the character shown in the drawing and in operating the process of the instant invention, the porous cathode will ultimately lose a considerable quantity of its porosity. When this condition occurs and the flow rates are no longer satisfactory for a given operation, that is when the material being purified can no longer be pumped through the cell at the rate desired by the operator, the operation of the cell is changed. This change in operation involves reversing the polarity of the cell so that the porous cathode becomes an anode and the cell anode becomes a cathode. While this reversed polarity condition is in operation the caustic liquor flow may be maintained as it was before polarity reversal, that is the flow of caustic may continue in the same direction. If desired the flow of liquor may be reversed during the polarity reversal so that it now flows in a direction different than it was before reversal. Since the cell is operating electrolytically in reverse metal ion impurities contained in the pores of the cathode as metal find their way into the caustic solution as ions once again and become redissolved. Some impurities, such as nickel, in the pores come in part off as colloidal or peptized solid. This reversing of the cell current is conducted for periods of time ranging from 15 minutes to 2 hours or longer if necessary until the graphite or carbon electrode material returns to or close to its original porosity. If the liquor flow is reversed during reversal of the cell polarity, the liquor will be pumped at a constant rate, and the level of liquor in the standpipe 6 in FIGURE 1 of the drawing will indicate the reduction in back pressure accomplished as metal ions contained in the cathode as metals go back into solution. When a satisfactory level is reached, that is, a level which is at or close to the original porosity of the cell, the cell is within 10 to 30 percent for example of the original porosity of the electrode material, the current and flow reversals can be discontinued and the cell is now ready for operation in a normal manner for the purification of further quantities of liquor. If liquor flow is in the same direction during polarity reversal as before reversal, the reduction in back pressure to normal level of course will be observed by the level of liquor in standpipe 2 of FIGURE 1 of the drawing. The liquor recovered during current reversal otherwise may be discarded or treated for removal of its ion content. Generally speaking, this material may be chemically treated to precipitate the large quantities of metal contained therein. To minimize loss, if this liquor is to be discharged to waste very dilute solutions of alkali metal hydroxides may be employed during the current reversal for example 3 to 10 percent by weight alkali metal hydroxide.

If desired any electrolyte which will not unduly corrode the cell equipment and in which the metal ions removed on the cathode of the cell are soluble can be utilized during current reversal. Thus, for example, electrolytes other than hydroxides of alkali metals can be used. For example, aqueous solutions of sodium chloride, potassium chloride, lithium chloride, ammonium hydroxide, aqueous mineral acid solution such as hydrochloric acid, sulfuric acid, nitric acid, phosphoric acid and chromic acid may be employed. Indeed any electrolyte in which the metals normally contained on the cathode of the cells would be considered soluble and which at the same time would not be damaging to the electrode materials can be used.

The current reversal method of removing metal from the pores of the cathode of the cell is typically (and conveniently) conducted at the same current density that the cell was operated when the metals were plated out. If desired the current density can be lower than the current density employed during purification or it can be higher. At lower values the regeneration of the cathode should take longer than at the same current density while at higher values it should take considerably less time. As with plating out the metals at high current density, gas binding may occur during reversal at high current densities and the liquor flow rate may be increased to minimize any such effect if it occurs.

Current reversal is not always essential to effect regeneration. This may also be accomplished by stopping the current flow or reducing the current flow so that the potential on the cathode is below that at which the metals deposit out. Iron, for example, can be removed from a porous carbon cathode (to effect regeneration) while the current is off or the potential is reduced to an appropriate level. However, current reversal does speed up the rate of iron removal.

It is contemplated in treating caustic solutions or alkali metal hydroxide solutions contaminated with metal ions that the feed material will contain on a parts per million basis undesirable metal ions such as iron at approximately the 7 parts per million or less on an anhydrous NaOH basis. While these are typical of cell liquors which are produced by electrolytic diaphragm processes, obviously cell liquors which contain higher concentrations or extremely low concentrations may still be treated efficaciously in accordance with the teachings of this invention.

Generally speaking, iron levels on the order of approximately 3 to 4 parts per million are typical of those encountered and these may be effectively treated to remove the iron ion contamination to a level of 1 part per million or lower. However, the process will effectively treat iron levels much higher, e.g., 12 to 15 parts per million by weight of NaOH on an anhydrous basis. In addition to iron, typically these liquors are found to contain metal ions such as nickel, copper, manganese, calcium, magnesium, aluminum, chromium, lead, vanadium, molybdenum, titanium, beryllium, zirconium, tungsten, tin, strontium and barium. The process of the instant invention has been found to be effective in substantially reducing the concentration of many metal ions found in alkali metal hydroxide solutions. For example, in a caustic soda solution containing as little as 0.3 part per million nickel metal ion contamination reductions to a level of 0.1 part per million has been typical. With copper ion containing caustic soda solutions having as little as 0.2 part per million copper therein, copper has been reduced to 0.1 part per million.

Lead ion contamination at the levels of 2.7 parts per million has been reduced typically to 0.4 part per million or lower. Thus, as will be readily understood while certain particular ion impurities are found to be most undesirable in caustic soda, for example, iron, nickel and copper, other metal ions are also removed which renders the caustic soda extremely pure and free of metal ion impurities.

Alkali metal hydroxide solutions treated in accordance with this invention typically are solutions containing 15 to 50 percent or more alkali metal hydroxide by weight. While weaker (e.g., 5 or 10 percent) and more concentrated (e.g., 73 percent) solutions may be treated, the invention is best adapted to alkali metal hydroxides at the 35 to 50 percent by weight alkali metal hydroxide level. Preferably, the invention is conducted with alkali metal hydroxides having a concentration of about 50 percent alkali metal hydroxide by weight. The process while described herein with particular reference to sodium hydroxide solutions contaminated with metal ion impurities is equally efficacious when practiced with potassium hydroxide and lithium hydroxide solutions containing metal ion contamination.

For a more complete understanding of the present invention, reference is made to the following examples which are illustrated in some of the modes which may be employed in conducting the present invention.

Example I

A glass cell 2 inches in internal diameter and of the general configuration of the cell shown diagrammatically in FIGURE 1 of the drawings was employed as a cell for the purification of a sodium hydroxide liquor. This cell consisted of two glass half cells which were clamped together by the utilization of clamping rings 18 and 21 and the bolt members 23 and 24 to a graphite cathode 4 2½ inches in diameter and one inch thick. The graphite cathode material was porous having a density of 66 pounds per cubic foot. Physically it possessed a tensile strength of 110 pounds per square inch, a compressive strength of 500 pounds per square inch and a flexural strength of 250 pounds per square inch. The porosity on a percent basis was 48 percent, the pore diameter average was .0019 inch and it possessed an average permeability to water of 30 gallons per square foot per minute. This water permeability as well as those mentioned hereinbefore are at 70° F. water temperature, 5 pounds per square inch pressure on a block or plate 1 inch thick. One half inch of the graphite cathode was covered with an epoxy resin coating and the portion of the cathode was clamped to the half cells in the manner above described, thus presenting to the inside of the cell a graphic cathode surface 2 inches in diameter. Each of the glass tubes was provided with a standpipe or riser element 2 and 6, respectively. A nickel screen anode about 2 inches in diameter was placed in one half of the cell and spaced approximately ⅜ inch from the cathode member. Thermometers 9 and 13 were provided one on each side of the cell to measure the temperature of the incoming sodium hydroxide and the effluent sodium hydroxide. The feed pipe 10 for the sodium hydroxide was passed through an oil bath 19 and the liquor was forced through the feed line by means of a positive displacement pump 20. The product discharge pipe 12 was utilized to remove product sodium hydroxide from the cell. The riser 2 on the feed side of the cell was used to measure the back pressure on the porous graphite cathode and the height of the caustic contained within the standpipe varied during operation as the cathode porosity changed since the positive displacement pump was operated at a constant rate during the run. A 50 percent by weight sodium hydroxide solution was pumped to the cell by the positive displacement pump 20 at a rate of 3.2 pounds per minute per square foot. (Approximately 0.25 gallon per minute per square foot of cathode frontal area.) The feed caustic was maintained at 167° F. by the thermo-regulator 11 located in the liquid on the anode side of the cell. The cell was operated with a DC current at 13.8 amps per square foot current density and a voltage of between 1.6 to 1.9 volts. The run was continued for a 72 hour period. By calculation, the average retention time of the sodium hydroxide solution in the cathode was about 70 seconds. During this period of operation the alkali metal hydroxide fed to the cell contained 3.5 parts per million iron, 0.3 parts per million nickel, and 0.2 part per million copper. The effluent caustic during the run was collected, analyzed and found to contain 1 part per million iron, 0.1 part per million nickel, and 0.1 part per million copper. An analysis of metals on the cathode showed that at the completion of the run 7.6 grams per square foot iron, 0.7 gram per square foot nickel and 0.3 gram per square foot copper were plated out on the cathode.

Example II

Utilizing the cell of the Example I a continuous run was made for a period of five weeks to determine the feasibility of operating a cell of this character on a continuous basis. To the cell operated on a continuous basis a feed rate of 3.2 pounds per square foot per minute was employed with a 50 percent sodium hydroxide liquor. The cell operated at volts varying between 1.98 and 2.2 and a current density of 13.8 amps per square foot. Cell feed varied in temperature from 140° F. to 167° F. Current was reversed at the end of each 72 hour period and at varying current densities. Some reversals were accomplished at 13.8 amps per square foot. When a current density of 13.8 amps per square foot was employed during the reversal cycle, the reversal cycle lasted for 1.5 hours. During other 72 hour periods of operation a reversal at current density of 46 amps per square foot was employed. When 46 amps per square foot current density was employed, the current reversal was continued for a period of 0.5 hour. After five weeks of continuous operation the cathode plugged with materials which could not be removed easily by polarity reversal or by the passage of 180° F. water through the cell. When the cell was backflushed at high pressure with 180° F. water the plug was removed and the ΔP across the cathode of the cell returned to normal operating pressure.

During this operation 50 percent caustic solution was passed through the anode compartment of the cell and through the porous cathode to the catholyte compartment and ultimately removed as product. Metal depositions in 72 hour periods in the cathode were found to be substantial. The material utilized during the test was a sodium hydroxide solution containing 3.5 parts per million iron; 0.3 part per million nickel and 0.2 part per million copper. At the end of the run it was found that the caustic soda solutions obtained from the product discharge pipe contained 1 part per million iron or less, 0.1 part per million nickel and 0.1 part per million copper.

These liquors also contained 2.7 parts per million lead and less than 0.4 part per million lead was found in the catholyte discharge.

In FIGURE 2 there is shown a graph indicating the static pressure in millimeters of 50 percent sodium hydroxide encountered across the cell during part of the continuous operation and indicating one of the periods when the cell polarity was reversed. The back pressure on the cathode of the cell is indicated by static pressure of the millimeters of 50 percent caustic soda contained in the standpipe 2 of the FIGURE 1. As can be appreciated, thus, a current reversal is shown in FIGURE 2 for the purpose of removing the solid metals plated at the cathode surface at 240 hours. At the time of reversal the liquor in standpipe 2 stood at 2400 millimeters. After reversal the liquor level dropped to 500 as is shown in FIGURE 2, rose in 1 hour to 1000 and then the curve had a characteristic slope such as is shown between hours 160 and 240. This slope is typical of those obtained during each reversal during the run.

Near the end of the five-week run a backflush with water at 180° F. was utilized to remove a solid plug which could not be removed by simple current reversal. This plug persisted despite the fact that metals were removed during the current reversal period and was found after removal by the backflushing to be organic material in nature. The backflush was successful in completely removing this organic plug so that the operation of the cell continued without any difficulty.

The rate of flow of alkali metal hydroxide through the cell and porous electrode in this treatment is susceptible of considerable variation. Thus, the feed rate of alkali metal hydroxide to a cell such as employed in Example I can be considerably less than the 0.25 gallon per minute per square foot used in that example; e.g., feed rates as low as 0.05 or 0.1 gallon per minute per square foot of cathode frontal surface area. Higher rates also are useful, especially to sweep out gas bubbles arising with the use of the higher current densities.

As also illustrated by the examples, the alkali metal hydroxide solution is in contact with the porous cathode as it passes therethrough (residence or contact time) is more than momentarily, i.e., will be in excess of about 5 or 10 seconds and often can be 5 or 10 minutes.

Cathode thicknesses (measured parallel to the flow of alkali metal hydroxide therethrough) may be other than the one with thickness illustrated in the examples. Exemplary thicknesses of carbon cathodes range from about 0.25 inch to about 5 inches. Typical average pore diameters of the porous carbon cathode range from about 0.001 to 0.006 inch.

While the invention has been described with reference to certain specific examples and illustrative embodiments it is of course to be understood that it is not intended to be limited thereby except insofar as appears in the accompanying claims.

What is claimed is:

1. A method of reducing metal ion content of aqueous alkali metal hydroxide which comprises subjecting metal ion contaminated alkali metal hydroxide solution to electrolysis in an electrolytic cell while passing the solution through a porous cathode of the cell to deposit out the metal ion contamination in the cathode, the thickness of said cathode being at least about 0.25 inch.

2. The method of claim 1, wherein said alkali metal hydroxide is sodium hydroxide.

3. The method of claim 1, wherein said metal ion contamination includes iron ion.

4. The method of claim 1, wherein said metal ion contamination includes copper ion.

5. The method of claim 1, wherein said metal ion contamination includes nickel ion.

6. The method of claim 1, wherein said metal ion contamination includes lead ion.

7. The method of claim 1, wherein the cathode is a porous carbon cathode having a permeability to water at 70° F. of at least 14 gallons per square foot per minute and the electrolysis is conducted at a current density of 10 amps per square foot of cathode frontal area.

8. The method of claim 1 wherein the alkali metal hydroxide solution is sodium hydroxide solution containing 35 to 50 percent by weight sodium hydroxide.

9. The method of claim 1, wherein the alkali metal hydroxide is sodium hydroxide and the porous cathode is a porous carbon.

10. The method of claim 9, wherein the porous carbon is graphite.

11. A method of continuously removing metal ion contamination from an aqueous solution of alkali metal hydroxide comprising flowing said solution through a porous cathode of an electrolytic cell while electrolyzing the solution to thereby cause such metal ion to deposit out on said cathode, continuing such flow until the cathode back pressure has increased appreciably over its original value, reducing the current flow so that the potential on the cathode is below that at which the metals deposit out, while contacting said cathode with electrolyte to remove metal ions therefrom re-establishing the porous cathode at a potential at which it removes metal ions when the back pressure has been reduced appreciably below that which prevailed when operation of the cathode as a cathode was halted and resuming the flow of aqueous alkali metal hydroxide through the porous cathode to remove metal ion therefrom.

12. The method of claim 11, wherein the porous cathode is a porous carbon cathode having a permeability to water at 70° F. of at least 14 gallons per square foot per minute and the electrolysis is at a current density of at least 14 amps per square foot of cathode frontal area.

13. The method of claim 11, wherein the porous cathode is a porous carbon cathode of from 0.25 to 5 inches thickness.

14. The method of claim 11, wherein the polarity of the cathode is reversed when operation of the cathode as a cathode is halted and metal ion removal is effected.

15. The method of claim 14, wherein the electrolyte is a mineral acid.

16. A method of reducing metal ion content of aqueous alkali metal hydroxide which comprises subjecting metal ion contaminated alkali metal hydroxide solution to electrolysis in an electrolytic cell while passing the solution through a porous cathode of the cell to deposit out the metal ion contamination in the cathode, the average pore diameter of the porous cathode being up to 0.006 inch.

17. The method of claim 16 wherein the porous cathode is a porous carbon cathode and the alkali metal hydroxide is sodium hydroxide.

References Cited

UNITED STATES PATENTS

| | | | |
|---|---|---|---|
| 1,685,156 | 9/1928 | Giordani | 204—105 |
| 2,044,888 | 6/1936 | Overdick et al. | 204—153 |
| 2,273,795 | 2/1942 | Heise et al. | 204—294 |
| 2,495,457 | 1/1950 | Jacobs | 204—105 |
| 2,538,991 | 1/1951 | Trask | 204—113 XR |
| 2,864,750 | 12/1958 | Hughes et al. | 204—149 |
| 3,124,520 | 3/1964 | Juda | 204—151 |

OTHER REFERENCES

Transactions of the Electrochemical Society, vol. 75, pp. 147–166, Porous Carbon Electrodes. Copy in 204–294, 1939.

JOHN H. MACK, Primary Examiner

D. R. JORDAN, Assistant Examiner

U.S. Cl. X.R.

204—284